US012703616B2

(12) United States Patent
Bär

(10) Patent No.: US 12,703,616 B2
(45) Date of Patent: Aug. 11, 2026

(54) DRIVERLESS TRANSPORT VEHICLE

(71) Applicant: BÄR Automation GmbH, Gemmingen (DE)

(72) Inventor: Ralf Bär, Gemmingen (DE)

(73) Assignee: BÄR Automation GmbH, Gemmingen (DE)

( * ) Notice: Subject to any disclaimer, the term of this patent is extended or adjusted under 35 U.S.C. 154(b) by 7 days.

(21) Appl. No.: 18/855,373

(22) PCT Filed: Mar. 31, 2023

(86) PCT No.: PCT/DE2023/100252
§ 371 (c)(1),
(2) Date: Oct. 9, 2024

(87) PCT Pub. No.: WO2023/198246
PCT Pub. Date: Oct. 19, 2023

(65) Prior Publication Data

US 2025/0333278 A1 Oct. 30, 2025

(30) Foreign Application Priority Data

Apr. 11, 2022 (DE) ..................... 20 2022 101 950.9
Apr. 13, 2022 (DE) ..................... 20 2022 102 004.3

(51) Int. Cl.
*B66F 9/07* (2006.01)
*B66F 9/06* (2006.01)
*B66F 9/075* (2006.01)

(52) U.S. Cl.
CPC ............ *B66F 9/0755* (2013.01); *B66F 9/063* (2013.01); *B66F 9/07568* (2013.01); *B66F 9/07572* (2013.01)

(58) Field of Classification Search
CPC .... B66F 9/0755; B66F 9/063; B66F 9/07568; B66F 9/07572; B66F 7/065; B66F 9/065; B66F 9/12; B66F 9/24; G05D 1/0251
See application file for complete search history.

(56) References Cited

U.S. PATENT DOCUMENTS 5,829,948 A * 11/1998 Becklund .............. B66F 7/0625 254/8 R
9,260,125 B2 2/2016 Ellington et al.
2015/0347840 A1 12/2015 Iida
2018/0353040 A1* 12/2018 Matt .................... G05D 1/0016
2020/0174479 A1 6/2020 Howey
(Continued)

FOREIGN PATENT DOCUMENTS

CN 108298239 A 7/2018
DE 20007291 U1 9/2001
(Continued)

*Primary Examiner* — Rodney A Butler
(74) *Attorney, Agent, or Firm* — Smartpat PLC

(57) ABSTRACT

A driverless transport vehicle is movable in a X, Y plane and has a lifting table that is movable in the Z direction. It includes a base unit and a lifting table arranged on a drive-under/fork unit. Two drive and guide roller units are arranged below the base unit together with a non-drivable guide roller unit. Sensor means acquire raw data with respect to a video image of the object. Object identification means convert the raw data into object position data. Control means convert the object position data into control commands for the drive and guide sets.

8 Claims, 6 Drawing Sheets

(56) References Cited

U.S. PATENT DOCUMENTS

| | | | |
|---|---|---|---|
| 2021/0114854 | A1 | 4/2021 | Roethling et al. |
| 2023/0286788 | A1 | 9/2023 | Habedank et al. |
| 2024/0067510 | A1 | 2/2024 | Ulbrich et al. |

FOREIGN PATENT DOCUMENTS

| | | | |
|---|---|---|---|
| DE | 102008027701 | A1 | 10/2009 |
| DE | 102019215176 | A1 | 4/2021 |
| DE | 102019216181 | A1 | 4/2021 |
| DE | 102020006337 | A1 | 4/2021 |
| EP | 3663252 | A1 | 6/2020 |
| WO | 2022017688 | A1 | 1/2022 |

* cited by examiner

DRIVERLESS TRANSPORT VEHICLE

CROSS-REFERENCE TO RELATED APPLICATION

This application is a national stage application, filed under 35 U.S.C. § 371, of International Patent Application PCT/DE2023/100252, filed on Mar. 31, 2023, which claims the benefit of German Patent Applications DE 20 2022 101 950.9, filed on Apr. 11, 2022, and DE 20 2022 102 004.3, filed on Apr. 13, 2022.

TECHNICAL FIELD

The present disclosure relates to a driverless transport vehicle for transporting drive-under objects, such as floor rollers, trolleys, or the like, wherein the transport vehicle is movable omnidirectionally in a X, Y plane with respect to an orthogonal coordinate system and has a lifting table movable in the Z direction.

BACKGROUND

Many products or stacked pallets and crates having products are transported on manually movable ground rollers in internal logistics. Trailer systems or tugger trains or the like are used to transport these ground rollers or dollies or trolleys automatically.

Driverless transport systems are also known which drive under the ground rollers and drag them along or also can lift them completely.

In order that the driverless transport vehicles (DTVs) can drive under the ground rollers, the wheel diameters of the ground rollers or the frame itself are to be selected in a size corresponding to the vehicle height. This is accompanied by a loss of storage space, however. In addition, the ground rollers are then to be manufactured specially. Ground rollers can also be driven under, raised, and transported using a forklift system which uses tines. These systems are generally not suitable for small ground rollers, for example, having the standard dimensions 400×600 mm, because driving under with 2 standard tines is not possible for reasons of space.

DTVs having a flat lifting device for driving under flat ground rollers are known for small ground rollers. However, these DTVs are not driven so they are movable over a surface. The driving properties for moving and aligning the DTV in relation to a ground roller are therefore inflexible and restricted.

One possibility is to position the ground rollers on the ground by means of a rail.

DTVs are known which have a base unit and a tongue unit for driving under an object. To produce the surface mobility, four turntables are used in the case of these DTVs, which can each generate a rotational movement using two motors. Two turntables are arranged below the base unit and two turntables are arranged below the tongue unit. The turntables rotate due to the speed difference of the motors, wherein the control expenditure is very high, however, and a total of 8 motors are required. Since these motors are also installed in the tongue unit, they can only have a flat construction and are therefore not high-performance. Moreover, the tongue unit is relatively wide and is therefore not suitable for ground rollers having the dimensions 400×600 mm.

SUMMARY

The present application describes a driverless transport vehicle which ensures an automatic material supply within a production system. The driverless transport vehicle enables internal logistics processes to be optimized, ensures autonomous transport of ground rollers, trolleys, or the like having relatively high loads without problems, and can drive under an object, standing in any, even inaccurate position, on the shortest path with accurate positioning.

The transport vehicle is distinguished in that a drive-under/fork unit connected to the base unit is provided, on which the lifting table is arranged, the transport vehicle is designed as an omnidirectionally movable vehicle having two drive/steering roller units drivable via drive and steering assemblies and a nondriven steering roller unit. Either two drive and steering roller units spaced apart in the X direction are arranged below the base unit and the nondrivable steering roller unit is arranged spaced apart in the Y direction in the free end area below the drive-under/fork unit or one drive and steering roller unit is arranged spaced apart in the X direction below the base unit and a nondriven steering roller unit and, spaced apart in the Y direction in the free end area below the drive-under/fork unit, a drive and steering roller unit are arranged. Sensor means are provided which ascertain raw data with respect to a video image, point cloud, or distance data of the object. Object identification means are provided which have a communication connection to the sensor means and convert the transmitted raw data of the sensor means into current object position data. Control means are provided which have a communication connection to the object identification means and the drive and steering assemblies of the drive and steering roller units and convert the current object position data into control commands for the drive and steering assemblies of the drive and steering roller units, due to which a movement of the vehicle takes place in the direction of the object with respect to velocity, direction, and steering angle. The position change of the vehicle generated by the movement is currently acquired again and evaluated by the sensor means in relation to the object to be acquired, by which a control loop for the driving intention of the vehicle until reaching the drive under position for the object is created.

The driverless transport vehicle provides an omnidirectionally surface-movable vehicle having an object identification function, which identifies objects such as ground rollers, trolleys, or the like and can align and move itself in a surface-movable manner on the basis thereof and can therefore pick up and transport the object/the ground roller with accurate positioning.

In many known production lines, the object having the components stored thereon is supplied to the assemblers, who manually remove the components for the purpose of assembly. After completing the assembly, in the known object supply systems, the assembly worker then has to return the object, such as the ground roller, into an exactly specified position so that it can be reliably picked up and transported away by a driverless transport vehicle. This is no longer necessary with the driverless transport vehicle according to the invention, i.e. the assembly worker can move the object/the ground roller into an undefined and noninterfering position, wherein it is possible to pick up and transport away the object/the ground roller in this “imprecise” position without problems by way of the driverless transport vehicle according to the invention.

These object identification means have an object identification sensor system, such as a 3D camera, a scanner, or the like, which supplies an image or a point cloud having distance data of the individual pixels. These data are transmitted to the object identification means which, with the aid of specified parameters such as the width of the object, drive-under width of the object, and height of the object or, for example, via a previously trained neural network, determine the position of the trolley/ground roller from the transmitted data, for example point cloud. These position data are transmitted to the control unit, which performs the path planning and the chassis control. The respective new starting point of the DTV results with the respective current position of the object. This current starting point is converted by the control unit into control commands for the steering and drive units and output to the controllers of the respective DTV drives.

A closed control loop is obtained in that the DTV is in motion and the position of the object/ground roller relative to the DTV thus permanently changes and is continuously updated by the object identification means.

One particularly preferred embodiment is distinguished in that the sensor means have at least one 3D camera or at least one scanning unit.

One particularly advantageous embodiment is distinguished in that the object identification means have a storage unit, in which individual parameters with respect to geometry and appearance of the object are stored and are evaluable.

The nondriven steering roller unit is preferably designed as a multiple-mounted nondriven steering roller steering unit free of lateral forces, in particular as a twin roller unit.

One particularly preferred embodiment, which enables a secure pickup of objects of different geometries, is distinguished in that the lifting table has a movable stop unit, which is drivable in the Y direction by means of a drive assembly actuatable by the control unit and which forms the stop for the object to be driven under.

One advantageous embodiment, which ensures secure positioning of a received object on the lifting table, is distinguished in that the base unit has, in the Z direction above the lifting table, two clamping units, which are spaced apart in the X direction, are drivable by means of a drive assembly actuatable by the control unit, and are movable in the X and Y direction, which form a position securing function with respect to the received object that has been driven under.

According to one particularly advantageous refinement, the control unit is designed so that the drive assemblies for the movement of the stop unit and the clamping units are actuated accordingly as a function of the geometric data of the object ascertained by the object identification means, by which overall secure positioning of the received object on the lifting table is also ensured during transport.

One embodiment of the transport vehicle according to the invention that is particularly preferred with respect to the flexibility is distinguished in that the vehicle has a unit for the energy supply, in particular a battery or capacitor, which provides the energy for operating the assemblies.

To ensure a permanently reliable operational readiness of the vehicle without significant additional measures, one advantageous embodiment is distinguished in that the vehicle has a charging station via which the units for the energy supply are contactlessly chargeable.

One particularly advantageous refinement is distinguished in that the vehicle has a WLAN unit, by means of which a communication with respect to data input and/or data request can be established with the sensor means, the object identification means, and the control unit.

Different ground roller sizes can be detected or also multiple ground rollers can be picked up simultaneously by the adjustable stop unit on the lifting table.

The vertically-adjustable clamping device, which can be added on optionally, is predominantly used to secure unstable products against tipping.

An automatic material supply within a production of a facility is enabled in a simple manner by the driverless transport vehicle according to the invention. Due to the omnidirectional movement possibility of the vehicle in conjunction with the object identification, internal logistics processes can be optimized by the driverless transport vehicle. An automatic transport of ground rollers with large loads is possible without problems. The transport of standard or special cargo carriers can also be implemented without problems in accordance with the respective drive-under geometry of the object.

Because the vehicle is mounted on a total of three steering rollers-two driven steering rollers and one nondriven steering roller-a three-point support of the vehicle is always ensured if any floor irregularities are present, so that the steering rollers always have ground contact, by which an implementation of the respective driving path with accurate positioning is enabled.

Further embodiments and advantages of the invention result from the further features set forth in the claims and the exemplary embodiments specified hereinafter. The features of the claims can be combined with one another as desired, provided they are not obviously mutually exclusive.

BRIEF DESCRIPTION OF THE DRAWINGS

The invention and advantageous embodiments and refinements thereof are described and explained in more detail hereinafter on the basis of the examples shown in the drawings. The features to be inferred from the description and the drawings can be applied according to the invention individually as such or in multiples in any combination. In the figures.

DETAILED DESCRIPTION

Figure 1:
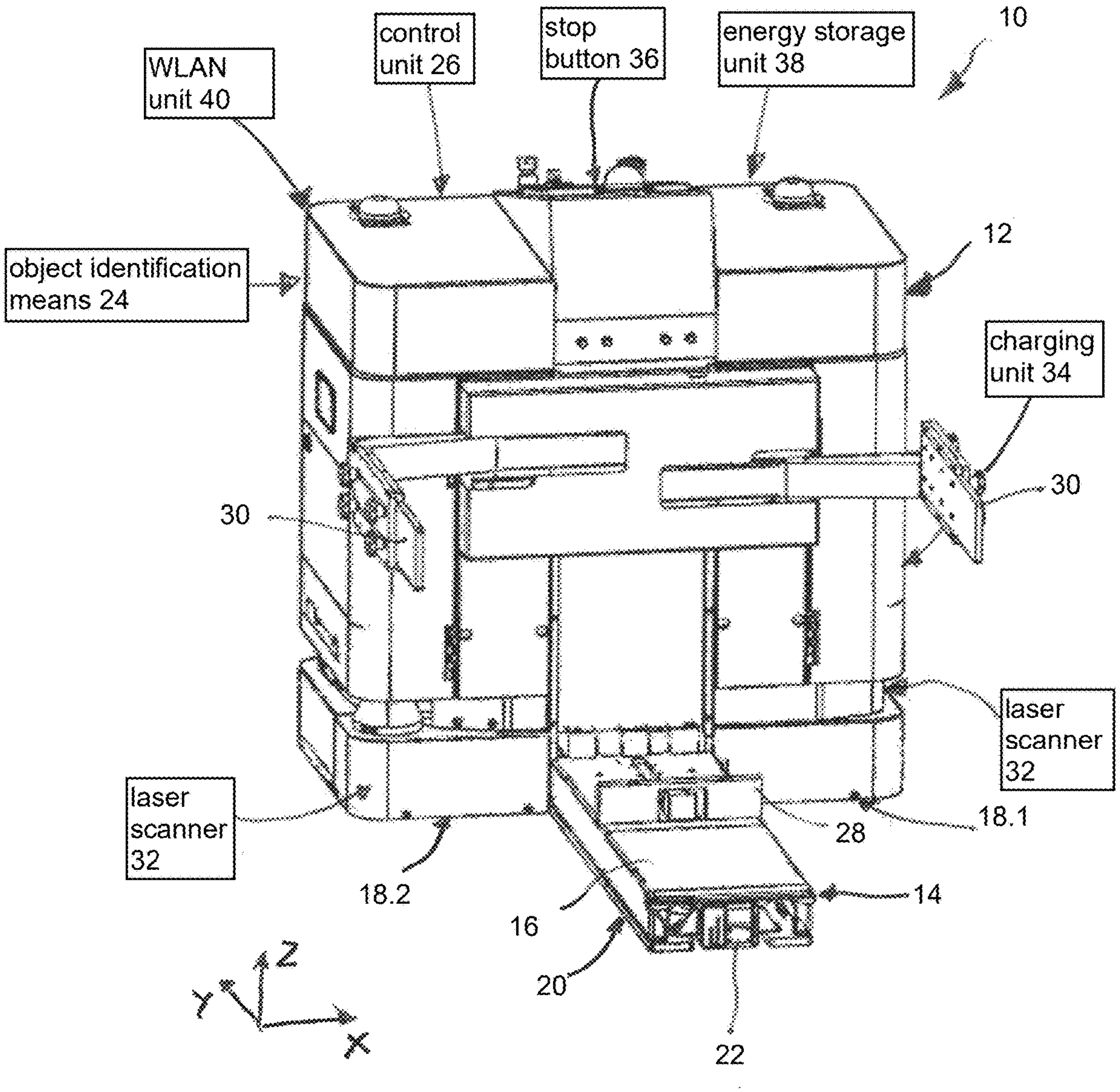
FIG. 1 schematically shows a perspective view of an exemplary embodiment of a driverless transport vehicle having a base unit and a projection unit, on which a vertically-adjustable lifting table is provided, having functionally important components schematically shown additionally in an exploded view, FIG. 2 schematically shows a second perspective view of a vehicle according to FIG. 1 without additional components.
Figure 2:
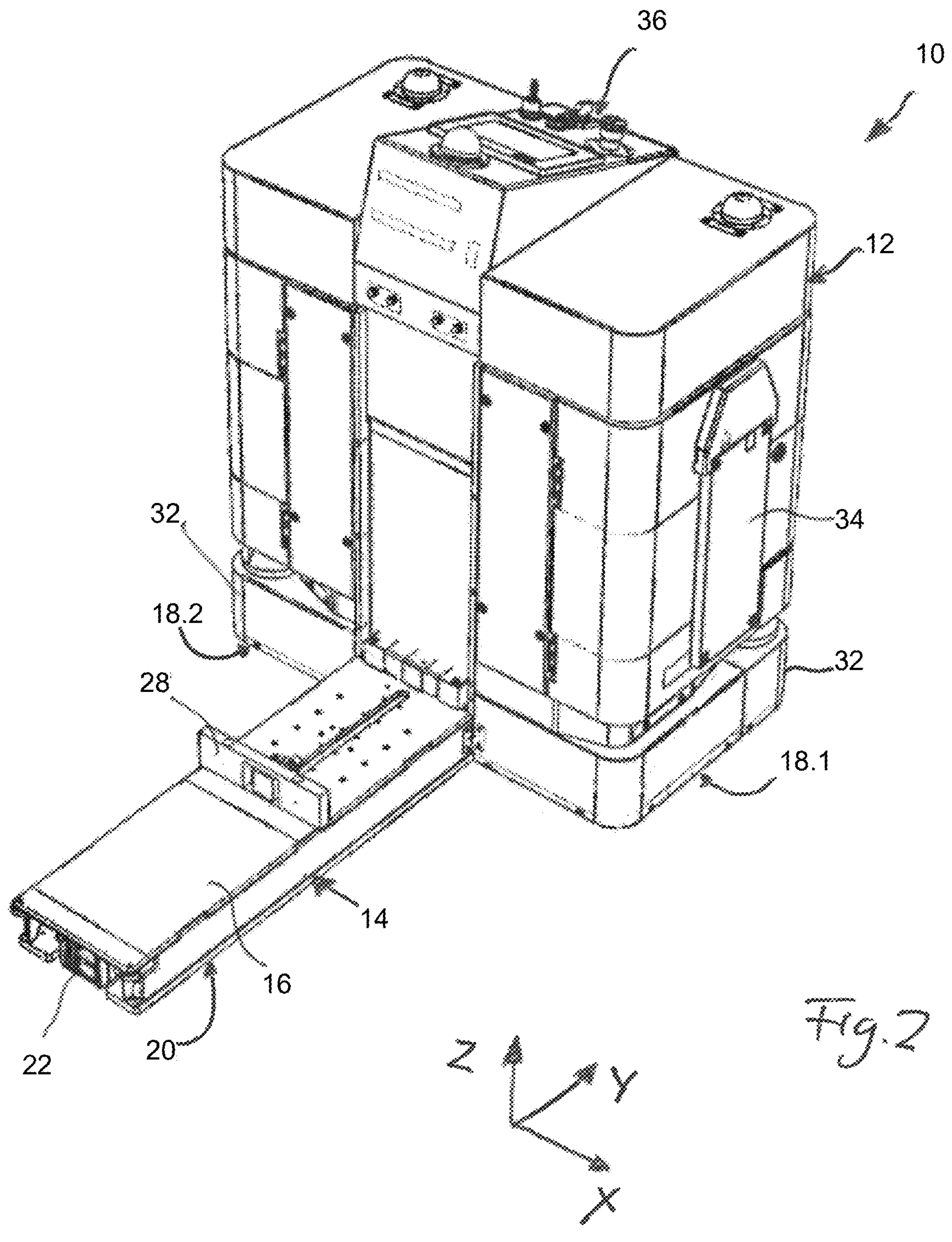
Figure 3:
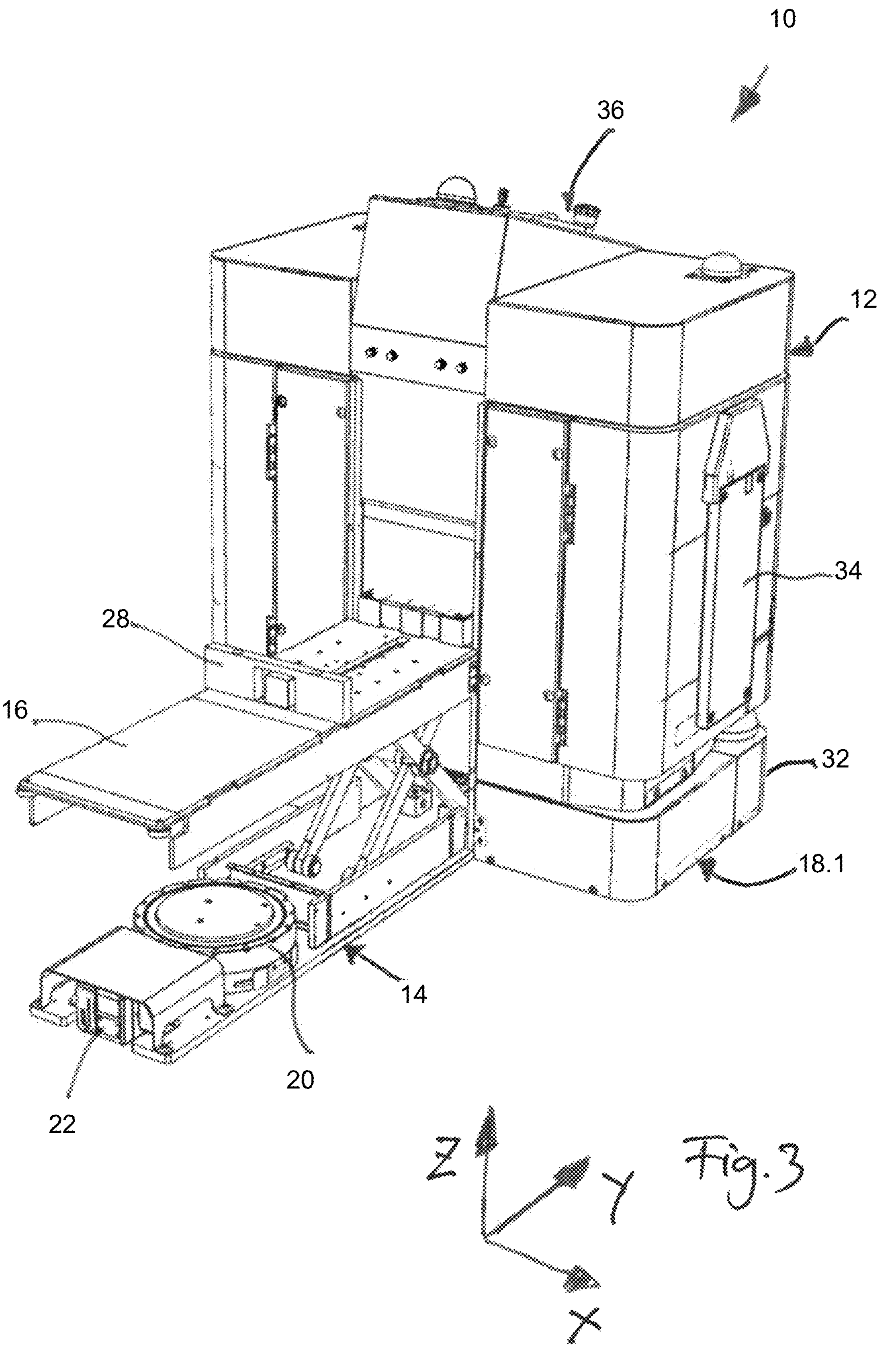
FIG. 3 shows a schematic perspective view of the vehicle according to FIG. 2 with raised lifting table.

FIG. 1 schematically shows a perspective representation of a driverless transport vehicle 10, wherein additional essential components are shown very schematically in an exploded view thereof. The driverless transport vehicle 10 has a cuboid base unit 12, on the lower side of which a drive-under unit 14 pointing forward in FIG. 1 is connected. The drive-under unit 14 is also referred to as a fork unit or tongue unit.

Furthermore, an orthogonal X, Y, Z coordinate system, which relates to the driverless transport vehicle 10, is indicated in FIG. 1. The X direction is designated hereinafter as the width direction, the Y direction is designated hereinafter as the projection direction, and the Z direction is designated hereinafter as the vertical direction.

A lifting table 16, which is designed to be movable in its position via a corresponding assembly in the vertical direction Z, is arranged on the drive-under unit 14 projecting in the projection direction Y.

A stop unit 28, which extends in the width direction X and is movable via an assembly in the projection direction Y, is provided on the lifting table 16.

Sensor means 22, which can be designed, for example, as a 3D camera or as a scanner, are arranged in the front end area of the drive-under unit 14.

A clamping unit 30 is attached to the base unit 12 in each case on the left and right offset upward in the vertical direction Z, which have a clamping jaw projecting in the projection direction Y in their respective outer end area and are designed as movable via assemblies in the vertical direction Z and in the width direction X.

The further components of the transport vehicle 10 additionally schematically shown in an exploded view in FIG. 1 consist of a control unit 26, object identification means 24, an energy storage unit 38 for the energy supply of assemblies provided within the vehicle, a WLAN unit 40 for wireless communication with external electronic control, regulation, and storage units, two laser scanners 32, which are arranged diagonally opposite on the base unit 12, for scanning the surroundings of the transport vehicle 10, a charging unit 34 for contactless charging of the energy storage unit 38, and a stop button 36 for manually stopping the movement of the transport vehicle in hazardous situations by way of a third party. A further laser scanner can also be provided, which is arranged in the front end area of the drive-under unit 14.

Figure 6:
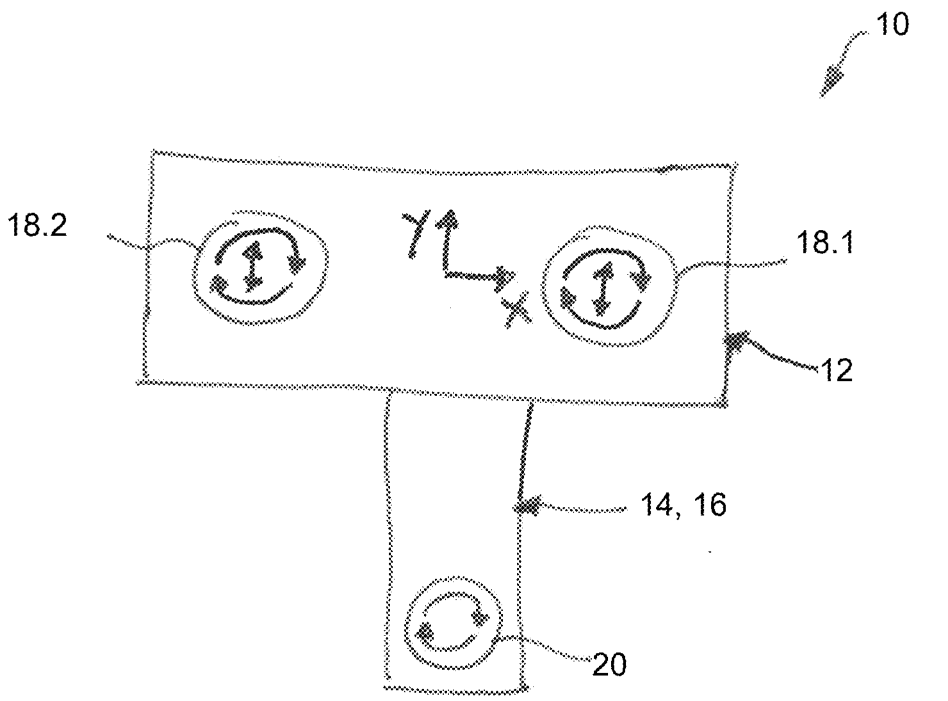

According to FIG. 6, the driverless transport vehicle is mounted on the lower side on roller units. In the constructive exemplary embodiment, steering/drive roller units 18.1, 18.2 arranged spaced apart in the width direction X are provided below the base unit 12 and a nondriven steering roller unit 20 is arranged in the end area of the drive-under unit 14.

The steering/drive roller units 18 each have a communication connection to a drive assembly and a steering drive assembly, which are actuatable by the control unit 26.

Figure 4:
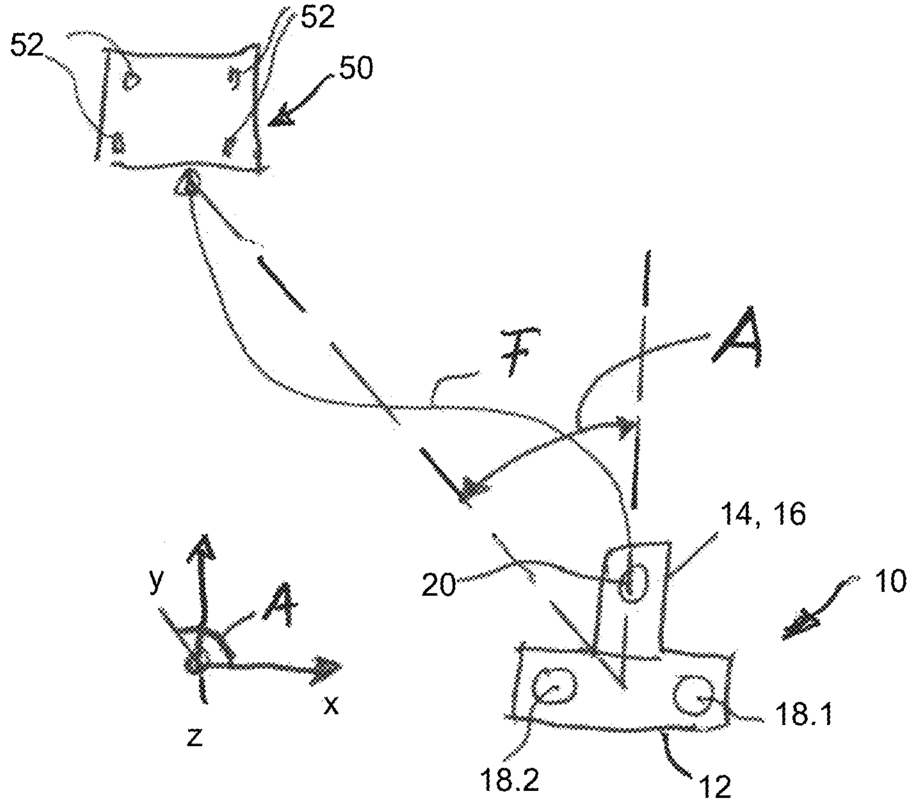
FIG. 4 shows a schematic top view of a driverless transport vehicle having an object to be driven under arranged at a distance.
Figure 5:
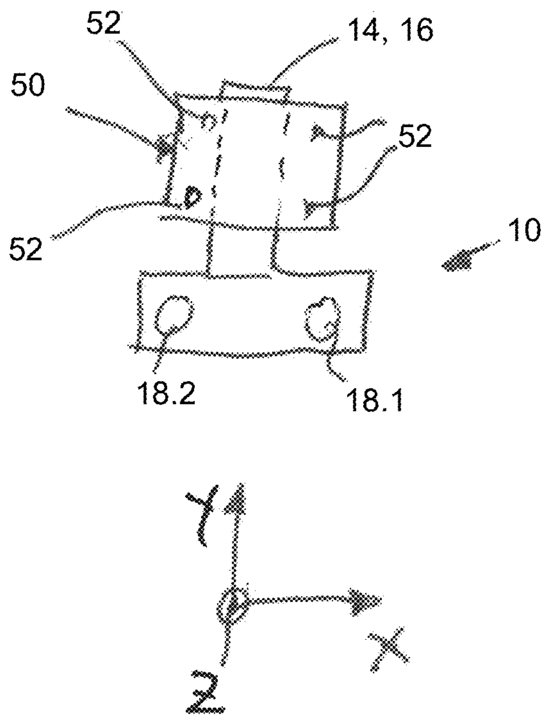
FIG. 5 shows a schematic top view of a driverless transport vehicle having an object which has been driven under, FIG. 6 schematically shows a bottom view of a driverless transport vehicle having two steering roller units having traction drive motor and steering drive motor, which are arranged below the base unit, and a nondriven steering roller unit, which is arranged below the projection unit.

FIG. 4 very schematically shows the situation in which a driverless transport vehicle 10 is shown spaced apart from an object 50 to be driven under, such as a ground roller or trolley, which is to be driven under, picked up, transported, and put down again by the transport vehicle 10, wherein the transport vehicle 10 has to cover a driving path F to drive under the object 50 in order to achieve a drive-under state, which is very schematically shown in FIG. 5. The object 50 is mounted on a total of 4 rollers 52.

The driverless transport vehicle 10 is designed according to the invention as an omnidirectionally surface-movable vehicle having object identification, which identifies an object 50 such as a ground roller and aligns itself by surface movement and omnidirectionally on the basis of the identification and drives toward the ground roller in a corresponding position in order to pick it up and be able to transport it.

Figure 8:
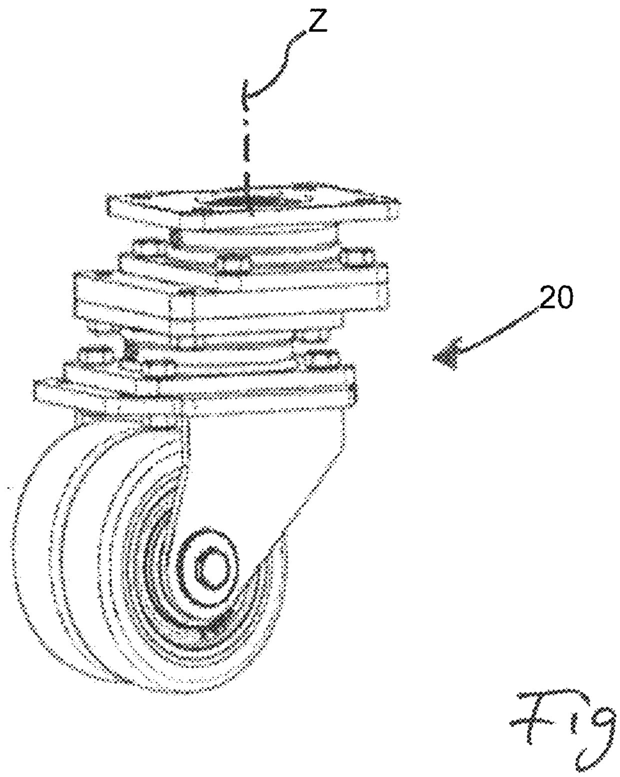
FIG. 8 shows a schematic perspective view of a nondriven, multiple-mounted twin steering roller unit free of lateral forces.

The nondriven steering roller unit 20 is designed as a double-mounted twin roller unit, which generates no or minor lateral forces upon a turn as a result of a steering movement and is known as such. A schematic exemplary embodiment of such a twin steering roller is shown in FIG. 8.

Figure 7:
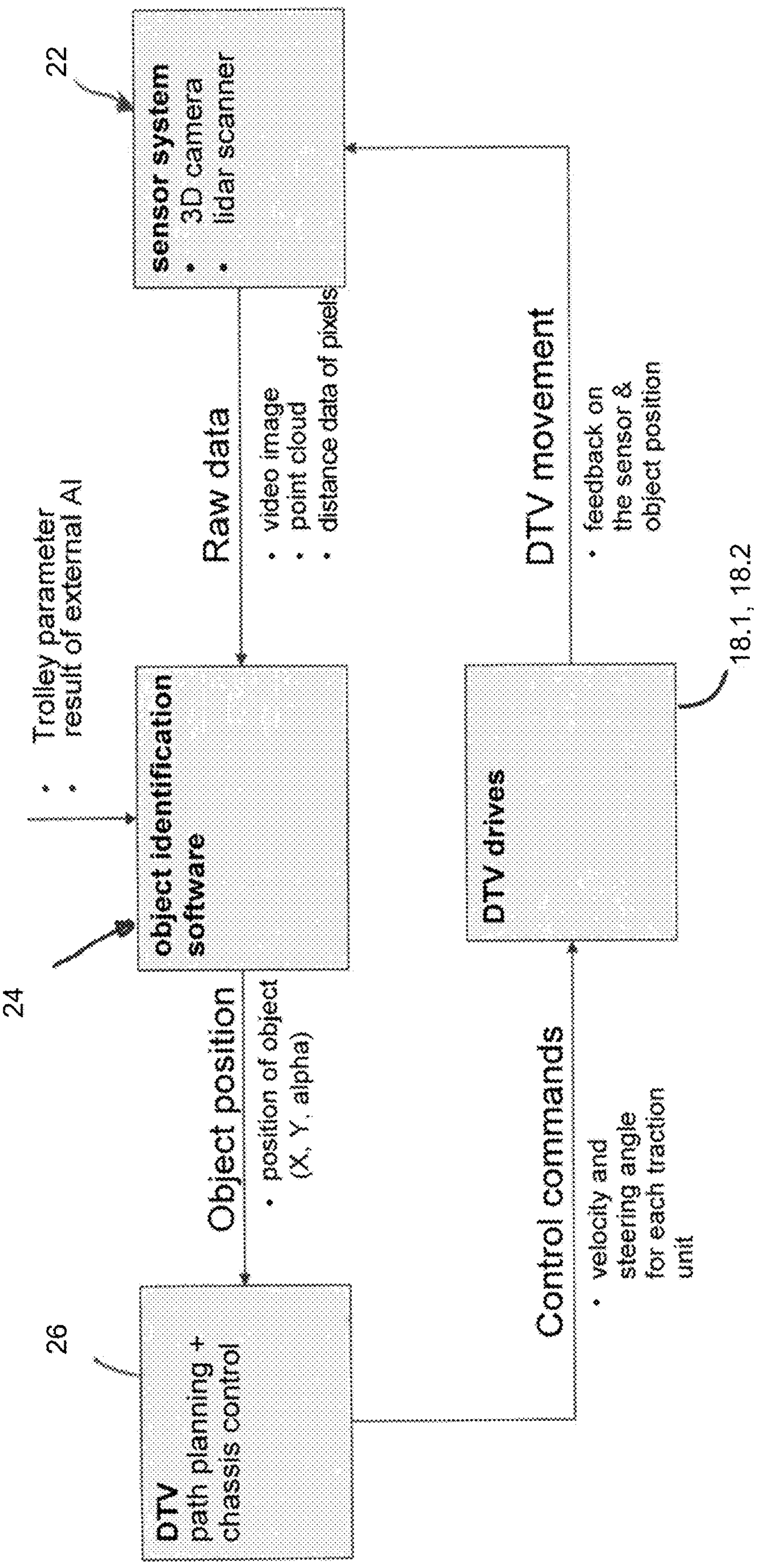
FIG. 7 shows a very schematic circuit diagram of the object identification function and the path planning function of the driverless transport vehicle as a control loop.

FIG. 7 very schematically shows a diagram of the individual sequences within the transport vehicle 10 for identifying an object 50 for moving the vehicle 10 to the object 50 to drive under it.

First, the sensor means 22, which have at least one 3D camera or at least one scanner, for example, detect the raw data of the object, for example, in the form of a video image or a point cloud having the distance data of the individual pixels. These raw data are transmitted to the object identification means 25, in which parameters have previously been stored with respect to the geometry of the object 50 to be enclosed for reference purposes. These parameters can also be the result of an external AI unit (artificial intelligence). The object identification means 24 evaluate the received raw data and determine the position of the object 50, for example, with respect to the coordinates X, Y and the associated angle A, which represents the current relative position of the vehicle 10 in relation to the object. This current object position is transmitted to the control unit 26, which carries out a chassis plan on the basis of these current data and creates control commands in the context of a chassis control, in particular with respect to velocity and steering angle for each steering/drive roller unit 18.1, 18.2, due to which the driverless transport vehicle moves toward the object 50 to be driven under in the direction of the driving path F. This DTV movement in turn has feedback effects on the sensor means 22 and the changed current object position resulting therefrom. A control loop thus results, which ensures optimum, rapid, exact, and reliable ascertainment of the driving path F of the vehicle 10 to drive under the object 50.

After the driving under (see FIG. 5), the lifting table 28 is activated and raised to acquire the object 50. The stop unit 28 has been moved beforehand into the associated position by the control unit via actuation of the corresponding assembly for this purpose in accordance with the geometry of the object to be picked up.

At the same time, by corresponding movement of the clamping units 30 in the vertical direction Z and in the width direction X, the received object can be secured in position in order to reliably prevent tipping of the received object during the transport. After the received object 50 is secured, the transport vehicle 10 moves into a position which is defined via a higher-order control system in communication with the control unit 26.

Using the driverless transport vehicle 10 described, an automatic material supply within the production of a production facility is possible without problems. Internal logistics processes can be adapted to the respective conditions and optimized without great effort. Automatic transports from and to specified positions of objects such as ground rollers are possible without problems.

The invention claimed is:

1. A driverless transport vehicle (10) for transporting drive-under objects, comprising:

a base unit (12);

a drive-under/fork unit (14) connected to the base unit (12);

a lifting table (16) arranged on the drive-under/fork unit (14), the lifting table (16) being movable in a Z direction with respect to an orthogonal coordinate system (X, Y, Z);

two drive and steering roller units (18.1, 18.2) drivable via drive and steering assemblies and a nondriven steering roller unit (20) whereby the driverless transport vehicle (10) is movable omnidirectionally in an X, Y plane, wherein either the two drive and steering roller units (18.1, 18.2) are spaced apart from each other in an X direction and arranged below the base unit (12) and the nondriven steering roller unit (20) is arranged spaced apart in a Y direction therefrom in a free end area below the drive-under/fork unit (14), or one of the two drive and steering roller units (18.1) and the nondriven steering roller unit (20) are spaced apart from each other in the X direction arranged below the base unit (12) and another of the two drive and steering roller units (18.2) is arranged spaced apart in the Y direction therefrom in the free end area below the drive-under/fork unit (14);

sensor means (22) for determining raw data with respect to a video image, a point cloud, or distance data of an object (50);

object identification means (24) having a communication connection to the sensor means (22) for converting the raw data of the sensor means (22) into current object position data; and control means (26) having a communication connection to the object identification means (24) and the drive and steering assemblies of the drive and steering roller units (18.1, 18.2), the control means (26) being configured for converting the current object position data into control commands for the drive and steering assemblies of the drive and steering roller units (18.1, 18.2), whereby a movement of the driverless transport vehicle (10) takes place towards the object (50) with respect to velocity, direction, and steering angle, wherein a position change of the driverless transport vehicle (10) generated by movement in relation to the object is repeatedly acquired and evaluated by the sensor means (22), whereby a control loop for driving intention of the driverless transport vehicle (10) is generated until reaching a drive under position for the object (50), wherein the lifting table (16) has a stop unit (28), which is drivable and movable in the Y direction by a stop drive assembly actuatable by the control means, wherein the stop unit (28) forms a stop for the object (50) to be driven under, wherein the base unit (12) has two clamping units (30) in the Z direction above the lifting table (16), and wherein the two clamping units (30)

are spaced apart in the X direction, are drivable by a drive assembly actuatable by the control means, are movable in the X and Y direction, and form a position securing function with respect to the object that has been driven under.

2. The driverless transport vehicle as claimed in claim 1, wherein the sensor means (22) have at least one 3D camera or at least one scanning unit.

3. The driverless transport vehicle as claimed in claim 1, wherein the object identification means (24) have a storage unit, in which individual parameters with respect to geometry and appearance of the object (50) are stored and can be evaluated.

4. The driverless transport vehicle as claimed in claim 1, wherein the nondriven steering roller unit (20) is designed as a multiple-mounted nondriven steering roller steering unit free of lateral forces.

5. The driverless transport vehicle as claimed in claim 1, wherein the control means (26) actuates the stop drive assembly for movement of the stop unit (28) and the two clamping units (30) in dependence on geometric data of the object (50) ascertained by the object identification means (24).

6. The driverless transport vehicle as claimed in claim 1, further comprising a battery or capacitor which provides energy for operating the drive and steering assemblies.

7. The driverless transport vehicle as claimed in claim 6, wherein the battery is contactlessly chargeable by a charging station.

8. The driverless transport vehicle as claimed in claim 1, further comprising a WLAN unit, by which a communication with respect to data input and/or data request can be established with the sensor means (22), the object identification means (24), and the control means (26).

* * * * *